Oct. 25, 1938.　　A. HACKWORTH ET AL　　2,134,606
BOOK RACK
Filed Jan. 16, 1937　　2 Sheets-Sheet 1

Alfred Hackworth,
Anton S. Greive,
INVENTORS

Oct. 25, 1938.   A. HACKWORTH ET AL   2,134,606
BOOK RACK
Filed Jan. 16, 1937   2 Sheets—Sheet 2

Alfred Hackworth,
Anton S. Greive,
INVENTORS
BY Victor J. Evans & Co.
ATTORNEYS

P. T. Hickey
WITNESS

Patented Oct. 25, 1938

2,134,606

UNITED STATES PATENT OFFICE 2,134,606

BOOK RACK

Alfred Hackworth and Anton S. Greive, San Antonio, Tex.; said Hackworth assignor to Philip Joseph Schwartz, San Antonio, Tex.

Application January 16, 1937, Serial No. 120,972

1 Claim. (Cl. 211—43)

The invention relates to a book rack and more especially to a portable clamping book rack.

The primary object of the invention is the provision of a rack of this character, wherein one or several books can be conveniently clamped and when within the rack will be supported at rest upon rods having fitted thereon the slidable clamp for the books, the rack in its entirety being of novel construction.

Another object of the invention is the provision of a book rack of this character, wherein the same in its construction is adaptable for service on a table or desk and will maintain books held therein in order, being readily accessible and held on display.

A further object of the invention is the provision of a rack of this character, which is simple in construction, self-adjusting, thoroughly reliable and efficient in operation, neat in appearance, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings.

Similar reference characters indicate corresponding parts throughout the several views in the drawings.

Figure 1:
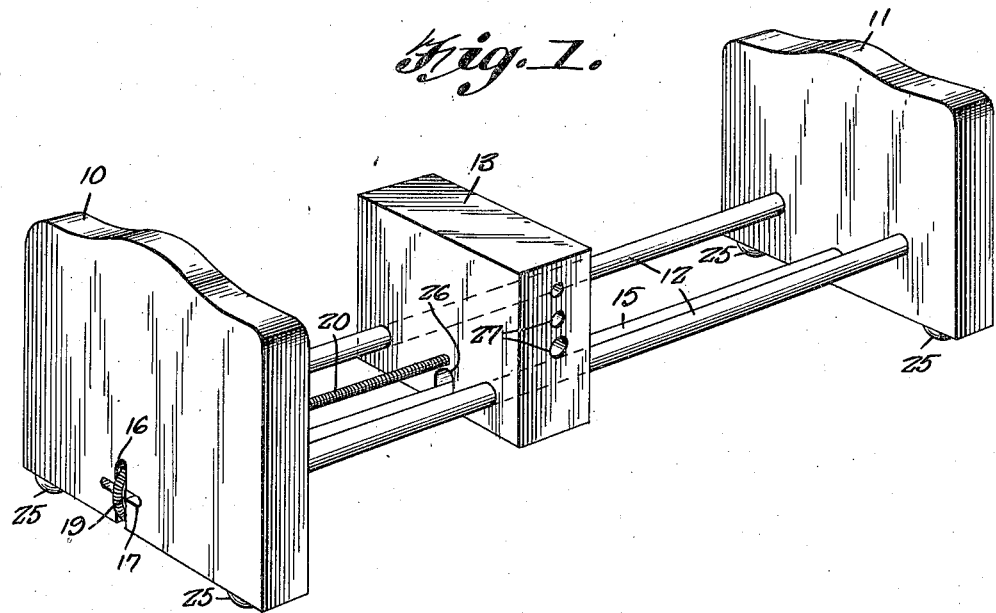
Figure 1 is a perspective view of the book rack constructed in accordance with the invention.
Figure 2:
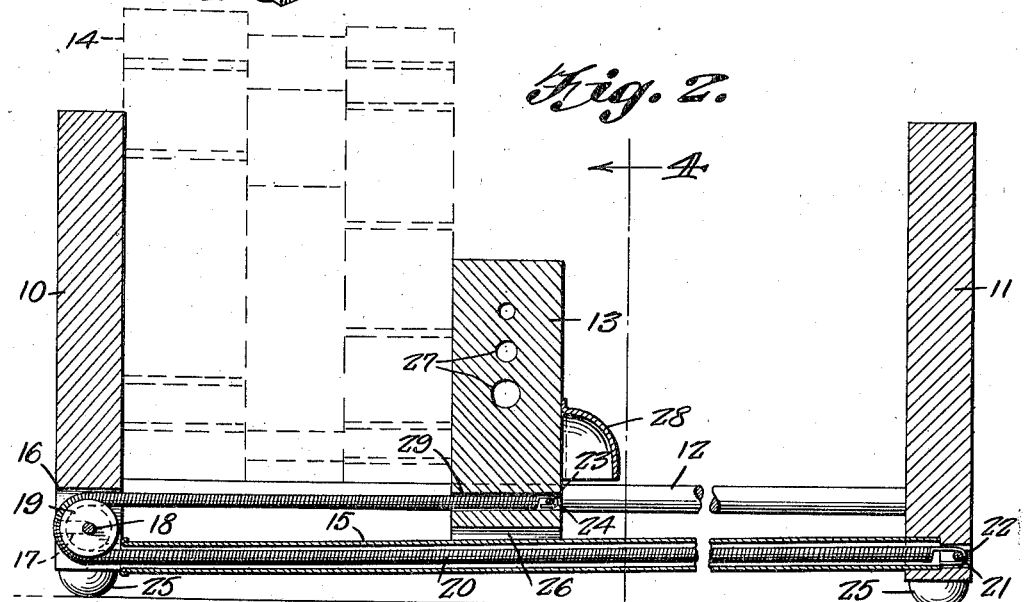
Figure 2 is a vertical longitudinal sectional view thereof.
Figure 3:
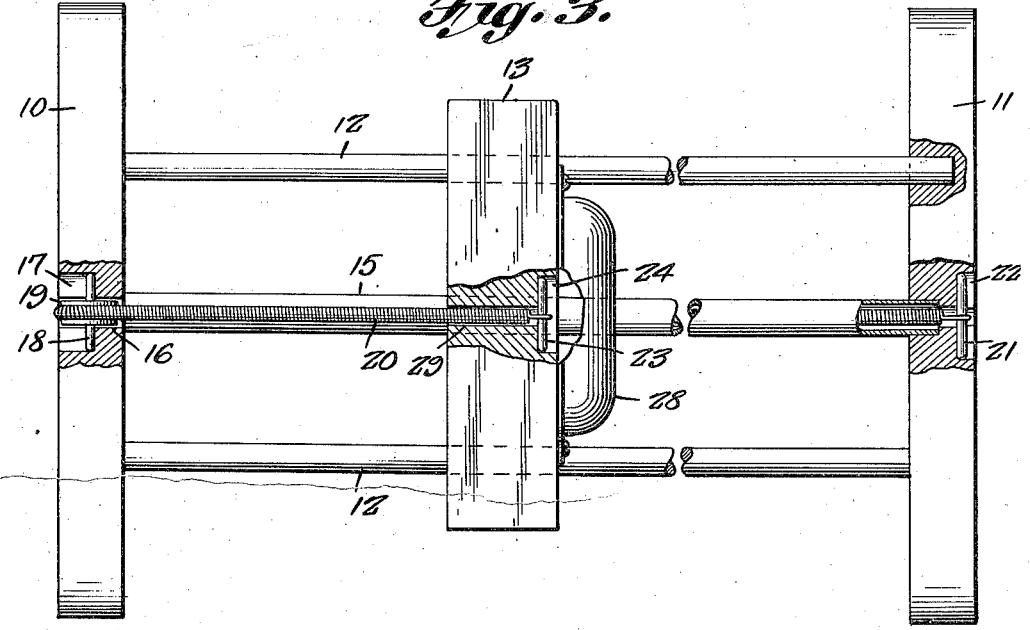
Figure 3 is a top plan view partly broken away.
Figure 4:
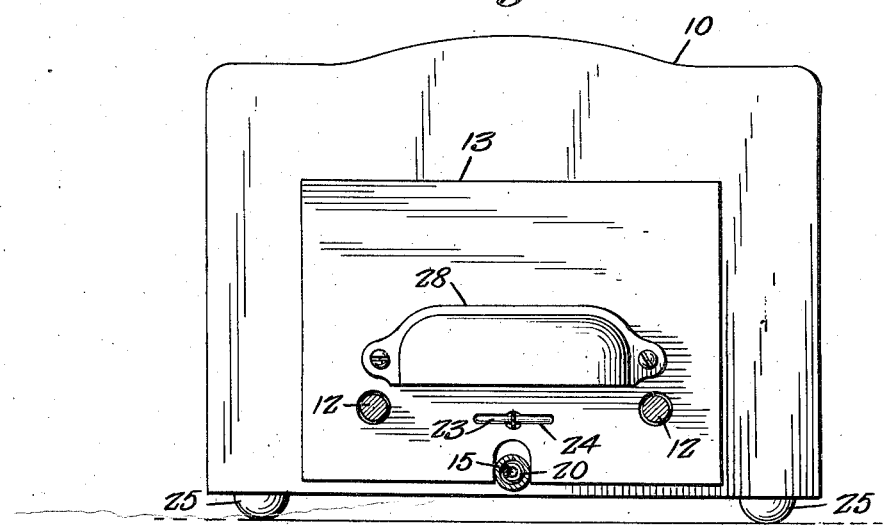
Figure 4 is a sectional view on the line 4—4 of Figure 2 looking in the direction of the arrows.

Referring to the drawings in detail, the book rack comprises a pair of upright or perpendicular end pieces 10 and 11, respectively, these being joined with the ends of spaced parallel horizontally disposed tubular rods 12 which at their ends are made secure in the pieces 10 and 11 in any suitable manner. Slidably fitted upon the rods 12 is a clamping block 13 which coacts with the piece 10 to hold fast books 14 when placed therebetween and supported at rest upon the rods 12.

Between the rods 12 and in a plane beneath the same yet parallel therewith is a tube 15, its ends being made secure in the pieces 10 and 11 in any desirable manner. The piece 10 is formed with a vertical slot 16 opening through the bottom edge thereof while intersecting this slot at opposite sides thereof are notches 17 removably receiving an axle 18 for a pulley wheel 19 when inserted in the slot 16. Trained over this pulley wheel 19 is a coiled retractile spring 20 which at one end is hooked to an anchoring pin 21 counterseated at 22 in the piece 11, the spring being trained through the tube 15 and has its other end hooked to an anchoring pin 23 counterseated at 24 in the block 13, thus through the medium of this spring 20 the block 13 will be held under tension for activity in clamping the book 14 placed between it and the piece 10 of the rack.

At the bottom edge of the pieces 10 and 11 are rubber feet 25 which avoid marring or scratching of furniture when the rack is at rest thereon.

The block 13 in its lower edge is formed with a cut-away portion 26 providing a clearance for the tube 15.

In the frontal face of the block 13 is formed a series of sockets 27, these being of varying sizes with respect to each other for accommodating pencils, pins or the like.

The block 13 carries a handle 28 convenient for unclamping of the books 14 when held within the rack.

The block 13 has a suitable passage 29 for the end of the spring engaged with the pin 23 in the counterseat 24 in said block.

What is claimed is:

A book rack comprising end pieces, intermediate and outer tubes between and fixed at their ends in said end pieces, a clamping block slidable on a pair of said tubes, a pulley fitted in one end piece, a coiled tensioning spring trained over the pulley and having one end fixed to the block and the other end trained through the other tube and fixed to the end piece remote from the one accommodating the pulley, removable anchoring pins for the attaching ends of said spring, and a removable axle for the pulley and counterseated in the end piece having the pulley fitted therein.

ANTON S. GREIVE.
ALFRED HACKWORTH.